United States Patent [19]
Ling

[11] Patent Number: 5,254,043
[45] Date of Patent: Oct. 19, 1993

[54] VARIABLE TRANSMISSION PULLEY
[75] Inventor: O'a Ling, Taipei, Taiwan
[73] Assignee: Vincent F. Colvin, Taipei, Taiwan
[21] Appl. No.: 977,642
[22] Filed: Nov. 17, 1992
[51] Int. Cl.$^5$ ............................................. F16H 55/52
[52] U.S. Cl. ...................................... 474/69; 474/11; 474/49
[58] Field of Search .................................. 474/11–14, 474/49, 50, 69, 70

[56] References Cited
U.S. PATENT DOCUMENTS 3,863,514  2/1975  Jensen ................................ 474/13
4,705,492 11/1987  Hattori et al. ..................... 474/49

Primary Examiner—Thuy M. Bui
Attorney, Agent, or Firm—Bacon & Thomas

[57] ABSTRACT

A transmission system for vehicles. The transmission system has a pulley mounting a shaft extending from a mandrel of a power source, an automatic clutch for driving a wheel and a belt linking the pulley with the clutch. The pulley has a first section securely mounting the shaft, a second section axially moving along the shaft and a disk securely mounting the shaft. The first and second sections each have a belt-engaging side shaped as a truncated cone. The second section further has a slide-engaging side formed with a number of radial slopes. A corresponding number of slides contact the slopes and the disk. When a rotational speed of the shaft increases, centrifugal forces exerted on the slides overcome a tension in the belt, so that the slides radially spread between the slide-engaging sides of the second section and disk for axially moving the second section toward the first section, so that the belt-engaging sides of the first and second sections expand the belt for raising a radius of curvature of the belt riding thereon. When the rotational speed of the shaft decreases, the tension in the belt overcomes the centrifugal forces exerted on the slides, so that the belt contracts for reducing the radius of curvature of the belt.

3 Claims, 3 Drawing Sheets

5,254,043

VARIABLE TRANSMISSION PULLEY

BACKGROUND OF THE INVENT

1. Field of Invention

The present invention relates to a vehicle employing a power source, e.g., an engine or a motor, for driving a wheel and, more particularly, to a pulley-belt-clutch assembly for transmission between the power source and the wheel and, still more particularly, to a variable transmission pulley.

2. Related Prior Art

Conventionally, gear boxes are incorporated in power transmission systems of vehicles for providing optimal torques for driving wheels of the vehicle dependent on different speeds of the vehicle and different resistances on the vehicle. Those gear boxes are operated manually or automatically. However, as gears are used, the torques can only be varied step by step, not continuously. Therefore, the present invention is intended to solve the abovementioned problem.

SUMMARY OF THE INVENTION

It is an object of the present invention to provide a transmission assembly.

It is another object of the present invention to provide a transmission assembly having a pulley linked with a clutch by means of a belt.

It is yet another object of the present invention to provide a variable transmission pulley for providing optimal torques for driving wheels.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
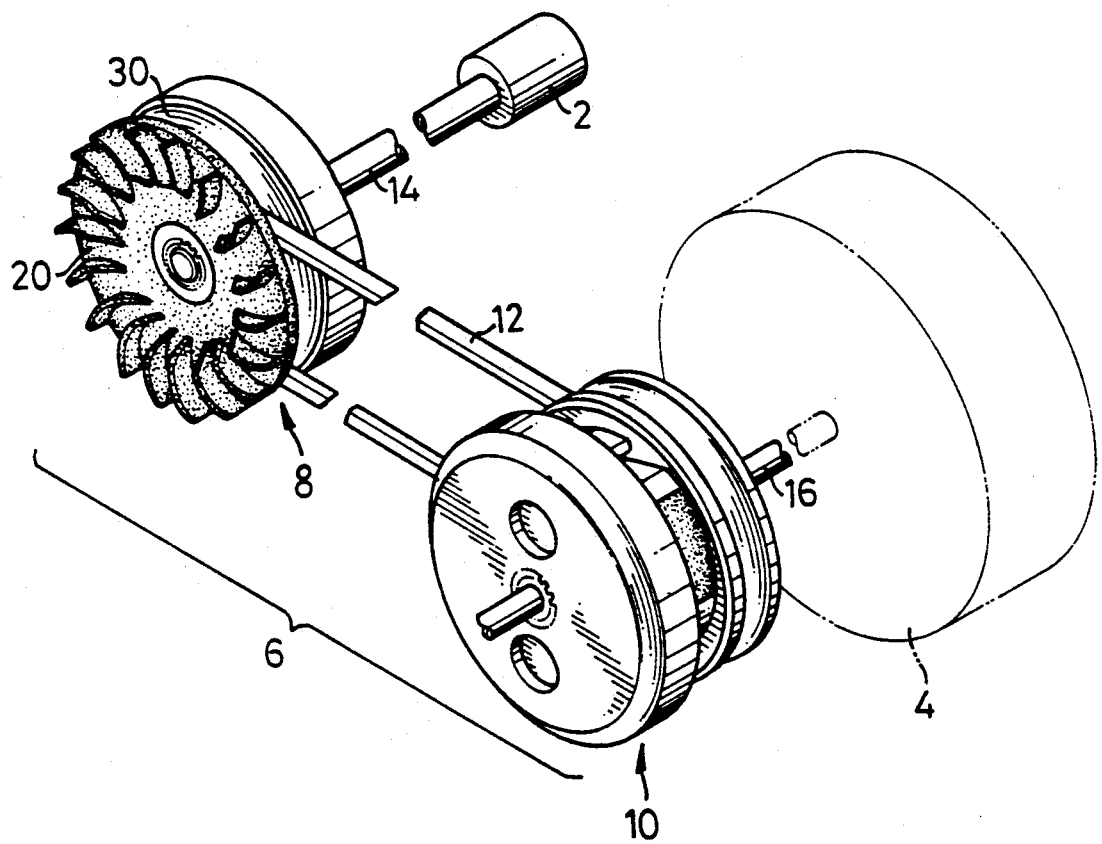
FIG. 1 is a top left rear view of a transmission system in accordance with the present invention.

Referring to the drawings and, initially, to FIG. 1, a power source 2, e.g., a motor or an engine, drives a wheel 4 by means of a transmission system 6 in accordance with the present invention. The transmission system 6 consists of a pulley 8 linked with an automatic clutch 10 by means of a belt 12. The pulley 8 is mounted on a shaft 14 which is a part of a mandrel of the power supply 2. The wheel 4 and the automatic clutch 10 are mounted on a common shaft 16.

Figure 2:
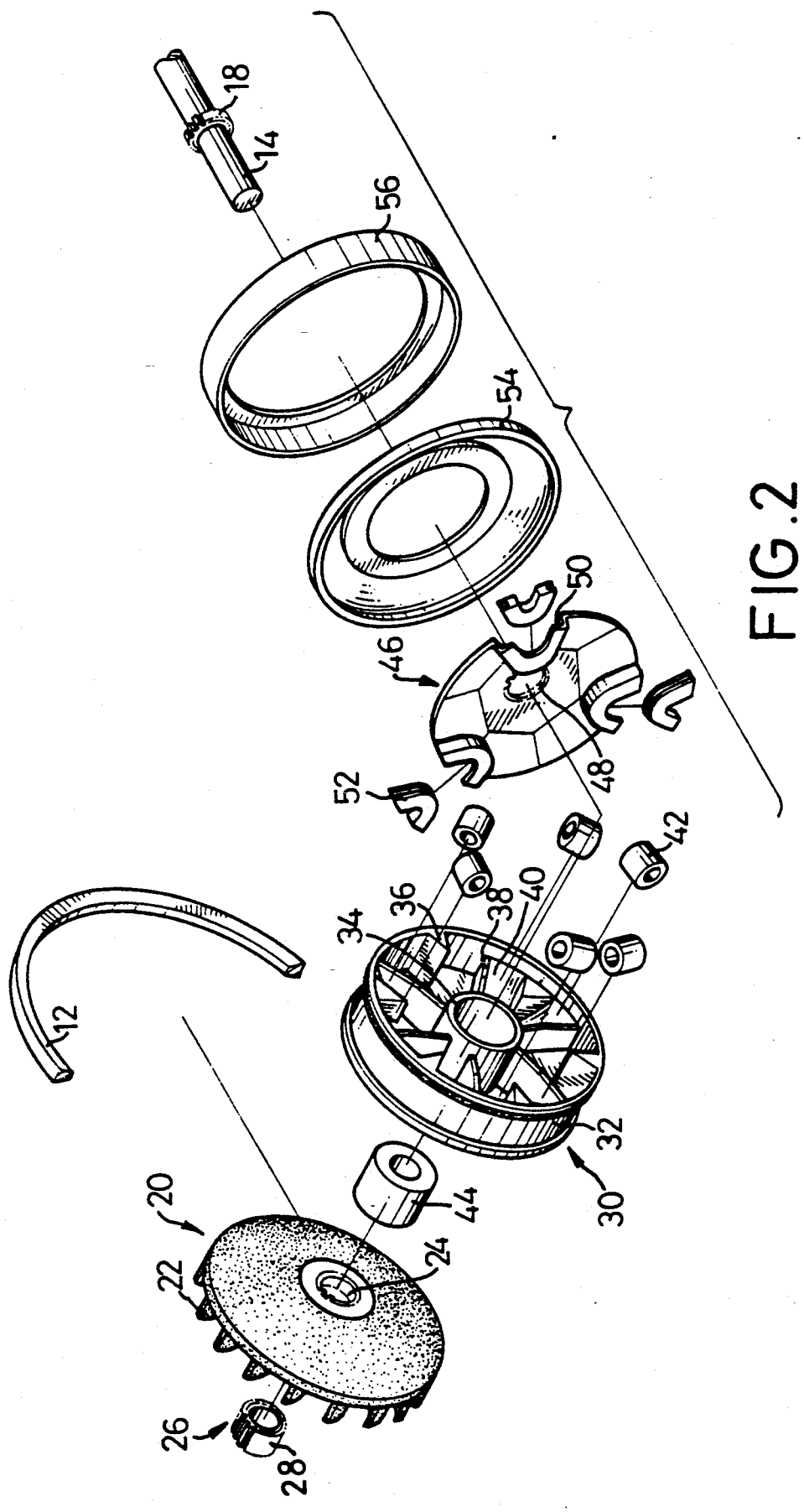
FIG. 2 is an exploded view of a variable transmission pulley in accordance with the present invention.
Figure 3:
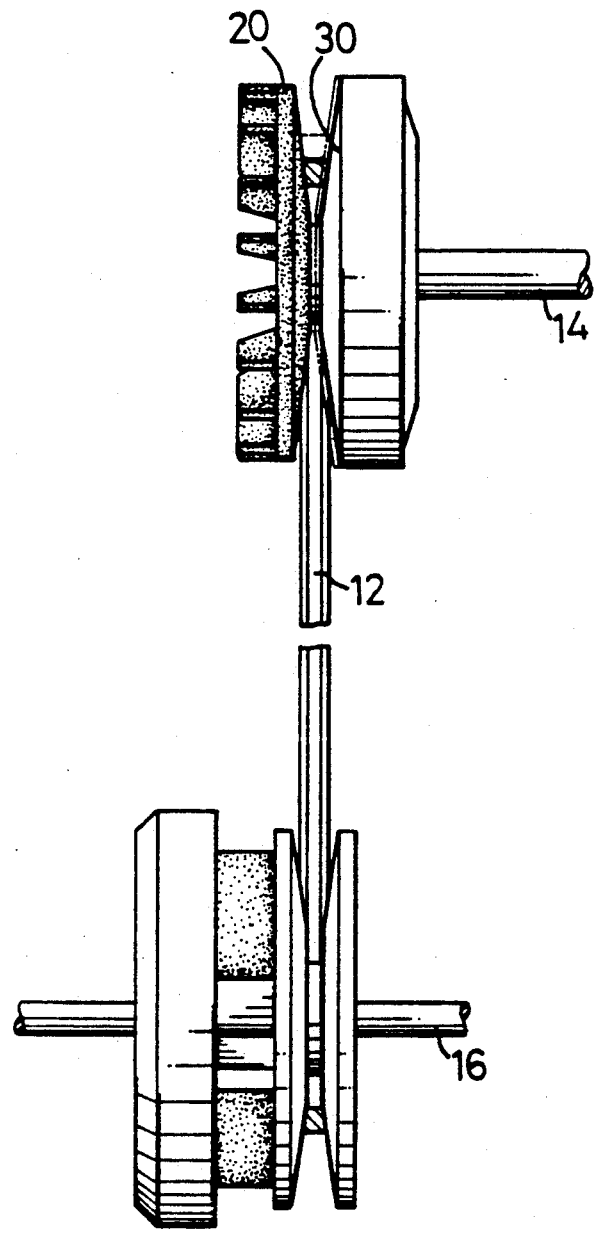
FIG. 3 is a top view of a transmission system in accordance with the present invention.

Referring to FIGS. 2 and 3, the shaft 14 has a coaxial gear 18 formed thereon. The pulley 8 has a first section 20 which is disk-shaped. A first side of the pulley 8 is formed with a number of radial fins 22 for heat dispersal. A second side of the pulley 8 is shaped as a truncated cone (see FIG. 3), for contacting the belt 12. A hole defined by a serrated periphery 24 is formed axially throughout the first section 20 A sleeve 26 wherein the shaft 14 can fit has a serrated periphery 28 corresponding to the serrated periphery 26

The pulley 8 has a second section 30. A first side of the second section 30 is shaped as a truncated cone (see FIG. 3) corresponding to the second side of the first section 20, for contacting the belt 12. The second section 30 has cc-axial cylindrical periphery 32 and hub 34 defining a passage. A number of limbs 36 are formed on the periphery 34, facing the rib 32. A number of partitions 38 are radially formed between the periphery 32 and hub 34, for separating a number of slopes 40. The slopes 40 slant from the periphery 32 to the hub 34.

A corresponding number of slides 42 are each sited between two partitions 38 so that the slides 42 each slide on one of the slopes 40.

A collar 44 is to be sited between the shaft 14 and the hub 34. A disk 46 has a central hole defined by a serrated perimeter 48 corresponding to the gear 18. A number of scoop-shaped receiving portions 50 are formed along a perimeter of the disk 46. Each of the scoop-shaped receiving portions 50 has a cutout. A corresponding number of substantially V-shaped buffers 52 are each sited in one of the scoop-shaped receiving portions 50. Each V-shaped buffer 52 engages with a corresponding limb 36 to enhance alignment therebetween, and to reduce vibration.

The pulley 8 also has an annular cover 54 and a cylindrical frame 56.

In assembly of the pulley 8, the shaft 14 penetrates the cylindrical cover 54 and the annular cover 52. The shaft 14 is then inserted through the hole defined in the disk 46 in order to have the gear 18 engage with the serrated perimeter 48. Thus, the shaft 14 is restrained from rotating with respect to the disk 46, i.e., the shaft 14 and the disk 46 have the same rotational speed. The shaft 14 is also restrained from axially moving relative to the disk 46. Each of the buffers 52 is sited in one of the receiving portions 50.

Each of the slides 42 is sited in one of the slopes 40. The shaft collar 44 is sited in the passage defined in the second section 30. The collar 44 is then mounted on the shaft 14 so as to permit the second section 30 to axially move along the shaft 14. Each of the limbs 36 engages with one of the buffers 52, so that the second section 30 is restrained from rotating relative to the disk 46, i.e., the second section 30 and the disk 46 has the same rotational speed. However, the second section 30 is permitted to axially move with respect to the disk 46.

The sleeve 26 is sited in the hole defined in the first section 20 so as to have the serrated periphery 28 engage with the serrated periphery 24. Thus, first section 20 is restrained from rotating with respect to the sleeve 26, i.e., the first section 20 and the sleeve 26 have the same rotational speed. The first section 20 is also restrained from axially moving relative to the sleeve 26. The shaft 14 is urged to fit in the sleeve 26, so that the shaft 14 is restrained from rotating with respect to the first section 20. The shaft 14 is also restrained from axially moving relative to the first section 20. The sleeve 26 is then mounted on the shaft 14 at a point, so that the second section 30 is permitted to axially move along the collar 44, accordingly the shaft 14, between the first section 20 and the disk 46. However, the limbs 34 must be retained to engage with the buffers 52 in order to ensure that the second section 30 synchronously rotates together with the first section 20 and the disk 46.

Referring to FIG. 3, the belt 12 rides on the pulley 8 and a pulley of the clutch 10. The first section 20 and the disk 46 are maintained in certain positions on the shaft 14. The second section 30 is permitted to slide on the collar 44 between the first section 20 and the disk 46.

As loaded with tension, the belt 12 tends to contract so as to reduce a distance from a position, where the pulley 8 contacts the belt 12, to the shaft 14. That is, the second section 30 is urged near the disk 46.

When the shaft 14 rotates, the first section 20, the second section 30 and the disk 46 synchronously rotate. The slides 42 also rotate. As subjected to centrifugal forces, the slides 42 move along the slopes 40, away from the hub 34 toward the periphery 32. As spreading radially, the slides 42 abutting against the disk 46 and the slopes 40 push the second section 30 toward the first section 20.

As clearly shown in a phantom line in FIG. 3, the second section 30 moves near the first section 20. As the second side of the first section 20 and the first side of the second section 30 are both shaped as truncated cones and the belt 12 cannot be compressed, the distance from the position where the pulley 8 contacts the belt 12 increases. A distance from a position where the pulley of the clutch 10 contacts the belt 12 remains unchanged. Accordingly, the rotational speed of the pulley of the clutch 10 increases.

The tension in the belt 12 will cause the belt 12 to contract to reduce the radius of curvature of the belt 12 on the pulley 8 when the rotational speed of the shaft 14 decreases. Clearly shown by the above description, an equilibrium between the tension of the belt 12 and the centrifugal forces exerted on the slides 42 ensure an optimal torque for driving the pulley of the clutch 10, in view of the rotational speed of the shaft 14.

The limbs 36 are incorporated in the second section 30 for engaging with the buffers 52 sited in the scoop-shaped receiving portions 50 of the disk 46 in order to ensure that the second section 30 synchronously rotates with the disk 46, but axially moves relative to the same. However, the pulley 8 can incorporate other devices, e.g., the second section 30 uses tubular elements (or columns) for engaging with columns (or tubular elements) formed on the disk 46. Alternatively, the hub 34 can use a serrated inner periphery for engaging with a serrated outer periphery of a hub protruding from the disk 46, without the collar 44. In another embodiment, the hub 34 can use a serrated inner periphery for engaging with a serrated portion formed on the shaft 14, without the collar 44.

The partitions 38 and slopes 40 are incorporated in the second section 30, for cooperating with the disk 46, so that the slides 42 can push the second section 30 to axially move along the shaft 14. In another embodiment, the slopes 40 can be replaced by a side shaped as a truncated cone. In still another embodiment, the slopes 40 are replaced by a side shaped as truncated cone and a number of partitions are formed on the disk 46 instead of the partitions 38 formed on the second section 30.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A pulley mounting a shaft and comprising:
a first section securely mounting the shaft and having a belt-engaging side shaped as a truncated cone;
a second section mounting the shaft so that said second section can axially move along said shaft but not rotating with respect to the shaft, and having a belt-engaging side shaped as a truncated cone and a slide-engaging side;
a disk securely mounting the shaft and having a slide-engaging side;
a number of slides contacting said slide-engaging sides of said second section and disk;
a belt contacting on said belt-engaging sides of said first and second sections;
when the rotational speed of the shaft increases, centrifugal forces exerted on said slides overcome a tension in said belt, so that said slides radially spread between said slide-engaging sides of said second section and disk for axially moving said second section toward said first section, so that said belt-engaging sides of said first and second sections expand said belt for raising a radius of curvature of said belt riding thereon;
when the rotational speed of the shaft decreases, the tension in said belt overcomes the centrifugal forces exerted on said slides, so that said belt contracts for reducing the radius of curvature of said belt.

2. A pulley in accordance with claim 1, further comprising a first means for allowing said second section to axially move along the shaft but for restraining said second section from rotating relative to said shaft.

3. A pulley in accordance with claim 1, further comprising means for allowing said slides to axially spread on said slide-engaging sides of said second section and disk but for restraining said slides from rotating on said slide-engaging sides of said second section and disk.

* * * * *